United States Patent [19]

Terry

[11] Patent Number: 5,799,535

[45] Date of Patent: Sep. 1, 1998

[54] KITCHEN APPLIANCE WITH A FLEXIBLE DRIVE

[76] Inventor: Russell Terry, Rte. 3, Box 107-B, LaFollette, Tenn. 37766

[21] Appl. No.: 673,381

[22] Filed: Jun. 28, 1996

[51] Int. Cl.⁶ .................. B01F 11/00; F16D 21/02; F16H 21/18
[52] U.S. Cl. .................. 74/16; 74/42; 192/48.91; 192/69.22; 366/129; 366/278
[58] Field of Search .............. 74/42, 16; 192/48.91, 192/69.62; 366/129, 278, 279

[56] References Cited

U.S. PATENT DOCUMENTS

| | | | |
|---|---|---|---|
| 1,039,342 | 9/1912 | Wheelock | 464/52 |
| 1,506,951 | 9/1924 | Soukup | 366/129 X |
| 1,677,375 | 7/1928 | Tapley | 464/52 |
| 1,701,795 | 2/1929 | Pitts | 464/52 X |
| 1,781,763 | 11/1930 | Newlin | |
| 2,792,579 | 5/1957 | Roy | 15/25 |
| 2,840,673 | 6/1958 | Burton | 464/52 X |
| 3,026,612 | 3/1962 | Szczepanski | 30/123 |
| 4,211,002 | 7/1980 | Kirk | 30/123.3 |
| 4,575,255 | 3/1986 | Kafka | 366/129 |

*Primary Examiner*—Allan D. Herrmann
*Attorney, Agent, or Firm*—Pitts & Brittian, P.C.

[57] ABSTRACT

A kitchen appliance with a flexible drive for driving one of a plurality of attachments. The kitchen appliance includes a flexible cable for delivering power from a motor and gear assembly to an attachment. The motor and gear assembly is constructed to oscillate or rotate the flexible cable. Moreover, the motor and gear assembly includes a motor and gear assembly switch which when closed powers the motor. The switch can be closed by moving the cable to close it.

11 Claims, 4 Drawing Sheets

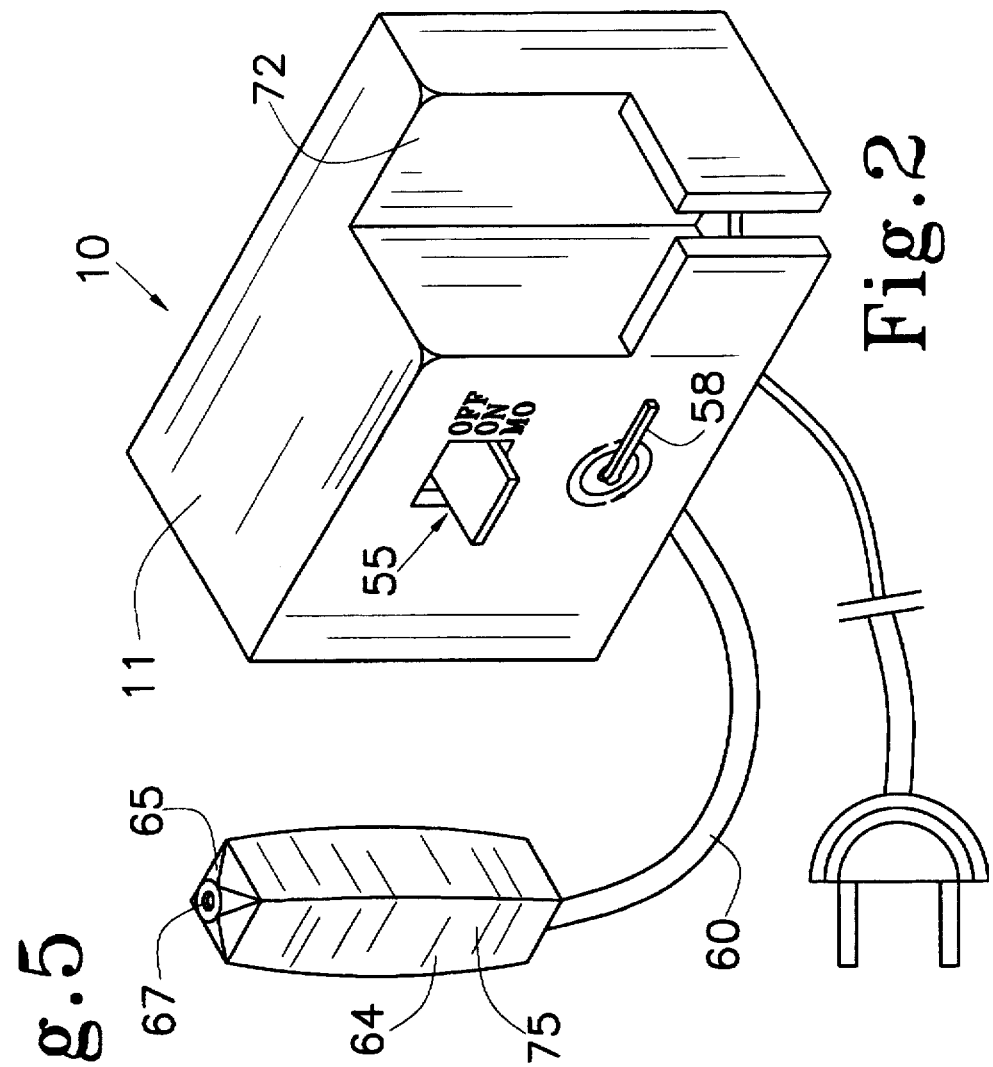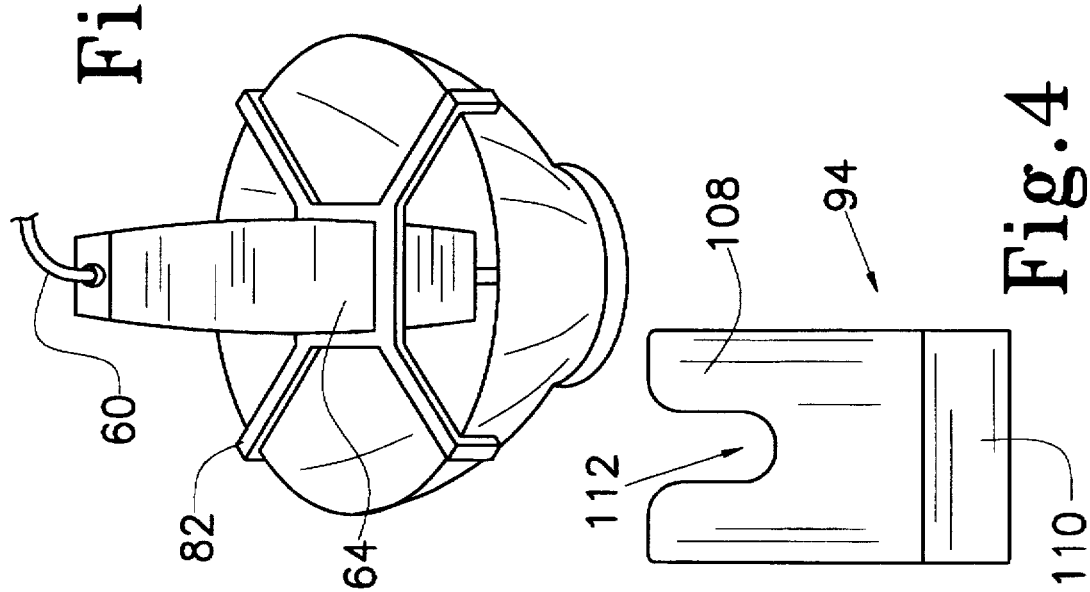

KITCHEN APPLIANCE WITH A FLEXIBLE DRIVE

TECHNICAL FIELD

This invention relates to the field of kitchen appliances and more specifically to a kitchen appliance with a flexible drive for driving at least one attachment.

BACKGROUND ART

Kitchen appliances have been developed to serve a variety of purposes. Several appliances have been developed to be used as a cleaning appliance or to operate with or in the presence of running water. Typical of the art are those devices disclosed in the following U.S. Patents:

| Pat. No. | Inventor(s) | Issue Date |
|---|---|---|
| 1,781,763 | C. O. Newlin | November 18, 1929 |
| 2,792,579 | J. D. Roy | May 21, 1957 |
| 3,026,612 | H. Szczepanski | March 27, 1962 |
| 4,211,002 | N. A. Kirk | July 8, 1980 |

The '763 patent teaches a spray brush which includes a handle in which a hollow shaft is carried for delivering water through a brush carried on the end of the handle. The shaft must be mechanically rotated to rotate the brush. The spray brush is complex in design and no means for rotating the shaft is disclosed.

The '579 patent teaches a rotatable brush for cleaning nursing nipples which is hand operated. The brush is configured to be receivable within a nursing nipple. The device is configured to specifically clean nursing nipples.

The '612 patent teaches a vegetable peeler which includes a flexible shaft for transferring power from a hydraulic motor to a rotor assembly. The hydraulic motor is powered by water and can be coupled to a conventional faucet. The hydraulic motor rotates the flexible shaft which in turn rotates a rotor assembly which includes a plurality of cutting surfaces which when rotated can be used to peel vegetables. The device is constructed such that it used solely as a peeler. It is not adaptable to be used for a variety of purposes including washing and mixing. Moreover, the disclosed motor rotates in one direction only.

The '002 patent teaches a hand-held peeler with a fluid driven motor. The motor is constructed such that when pressurized water flows through it, the motor rotates thereby rotating a bladed drum which is utilized to peel vegetables. The motor is constructed to rotate in one direction only and can not be adapted to oscillate back and forth.

Therefore, it is an object of the present invention to provide a kitchen appliance with a flexible drive wherein the end of the drive is isolated from electrical current such that the handle of the appliance can be used near water with no risk of electric shock or electrocution.

It is another object of the present invention to provide a kitchen appliance with a flexible drive to which a plurality of attachments can be individually attached such that the appliance can be used for a plurality of tasks.

It is yet another object of the present invention to provide a kitchen appliance with a flexible drive that provides a rotation mode and an oscillation mode such that the attachment is rotatable or oscillatable.

SUMMARY

Other objects and advantages will be accomplished by the present invention which teaches a kitchen appliance with a flexible drive. The kitchen appliance of the present invention includes flexible cable which delivers power from a motor and gear assembly to an attachment. The first end of the flexible cable is controlled by the motor and gear assembly. The second end of the flexible cable is supported in a handle. The shaft of the attachment is received within the handle and engages the second end of the cable such that when the cable rotates the attachment rotates. The motor and gear assembly is designed to rotate or oscillate the cable.

BRIEF DESCRIPTION OF THE DRAWINGS

The above mentioned features of the invention will become more clearly understood from the following detailed description of the invention read together with the drawings in which:

FIG. 2 is a perspective view of the exterior of the kitchen appliance;

FIG. 4 illustrates a view of the first end of the lever; and

FIG. 5 illustrates a means for supporting the appliance in a hands free manner.

DESCRIPTION OF PREFERRED EMBODIMENTS

A kitchen appliance with a flexible drive incorporating various features of the present invention is illustrated generally at 10 in the figures. The kitchen appliance 10 is designed to include a handle which is isolated from electrical current such that it can be used near or in water with no risk of electric shock or electrocution. Moreover, in the preferred embodiment, the kitchen appliance is designed to provide rotation and oscillation modes. Further, the kitchen appliance 10 is designed such that a plurality of attachments are securable thereto for a variety of tasks, including washing and blending. Also, in the preferred embodiment, the appliance is designed to be mountable above or near the sink.

Figure 1:
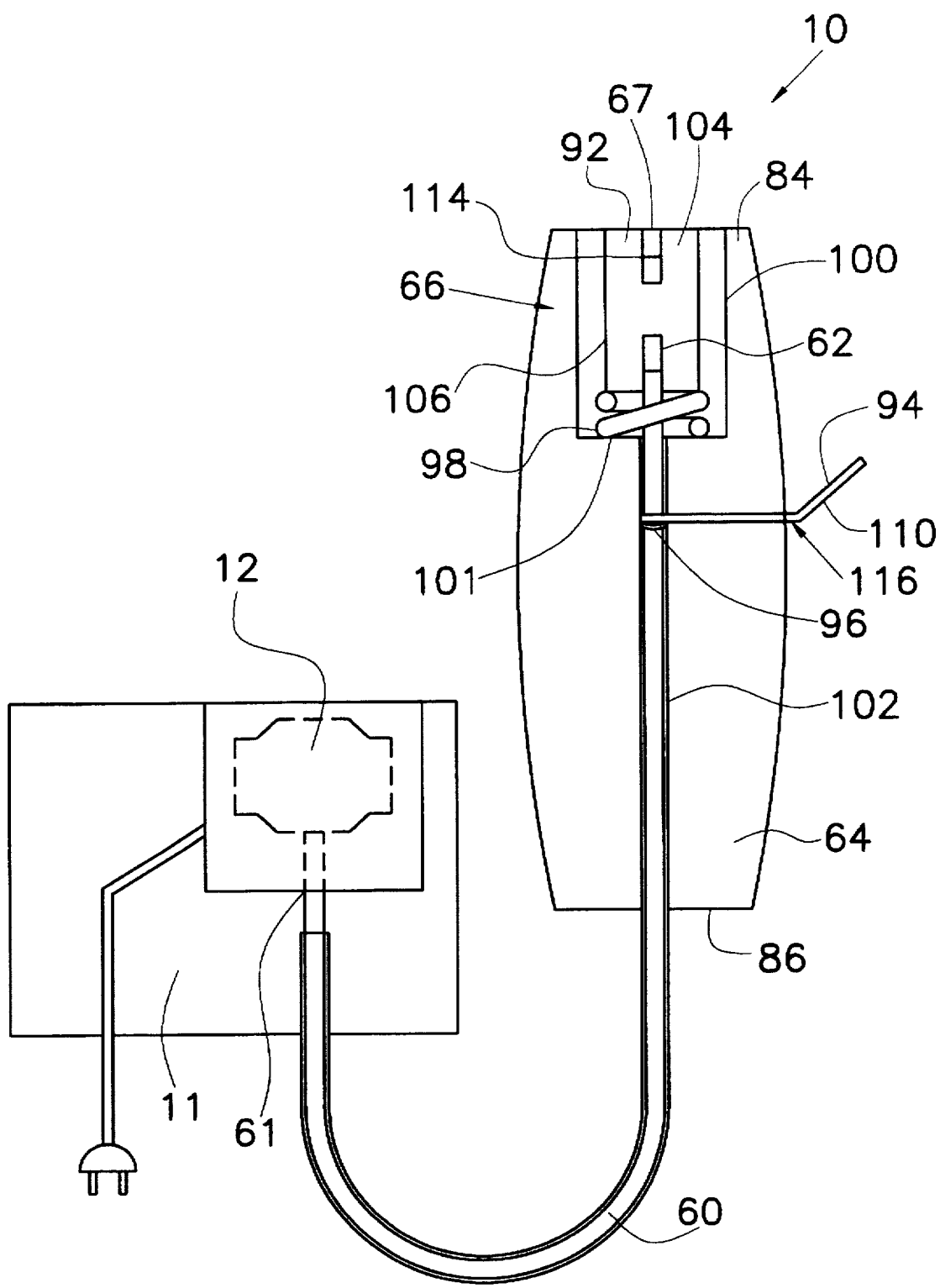
FIG. 1 is a general view, in section, of the kitchen appliance constructed in accordance with several features of the present invention

The kitchen appliance 10 is generally comprised of a motor and gear assembly 12 and a flexible cable 60, as shown in FIG. 1. The flexible cable 60 transfers power from the motor and gear assembly 12 to an attachment 68. The motor and gear assembly is designed to securely hold the first end 61 of the cable 60 and pivot the cable 60 with respect to the cable's longitudinal axis. The second end 62 of the cable 60 is received within a handle 64 and engages the end of an attachment 68 such that the attachment 68 pivots when the cable 60 pivots. The motor and gear assembly 12 is designed to provide two modes of pivoting motion to the cable 60, rotation and oscillation.

The motor and gear assembly 12 is housed in a housing 11. In the preferred embodiment, the housing 11 defines a recess 72 in which the handle 64 is supportable, as shown in FIG. 2. The motor housing 11 is designed to be mountable proximate a sink area. Moreover, the appliance 10 is designed to be powered by traditional household electricity.

Figure 3:
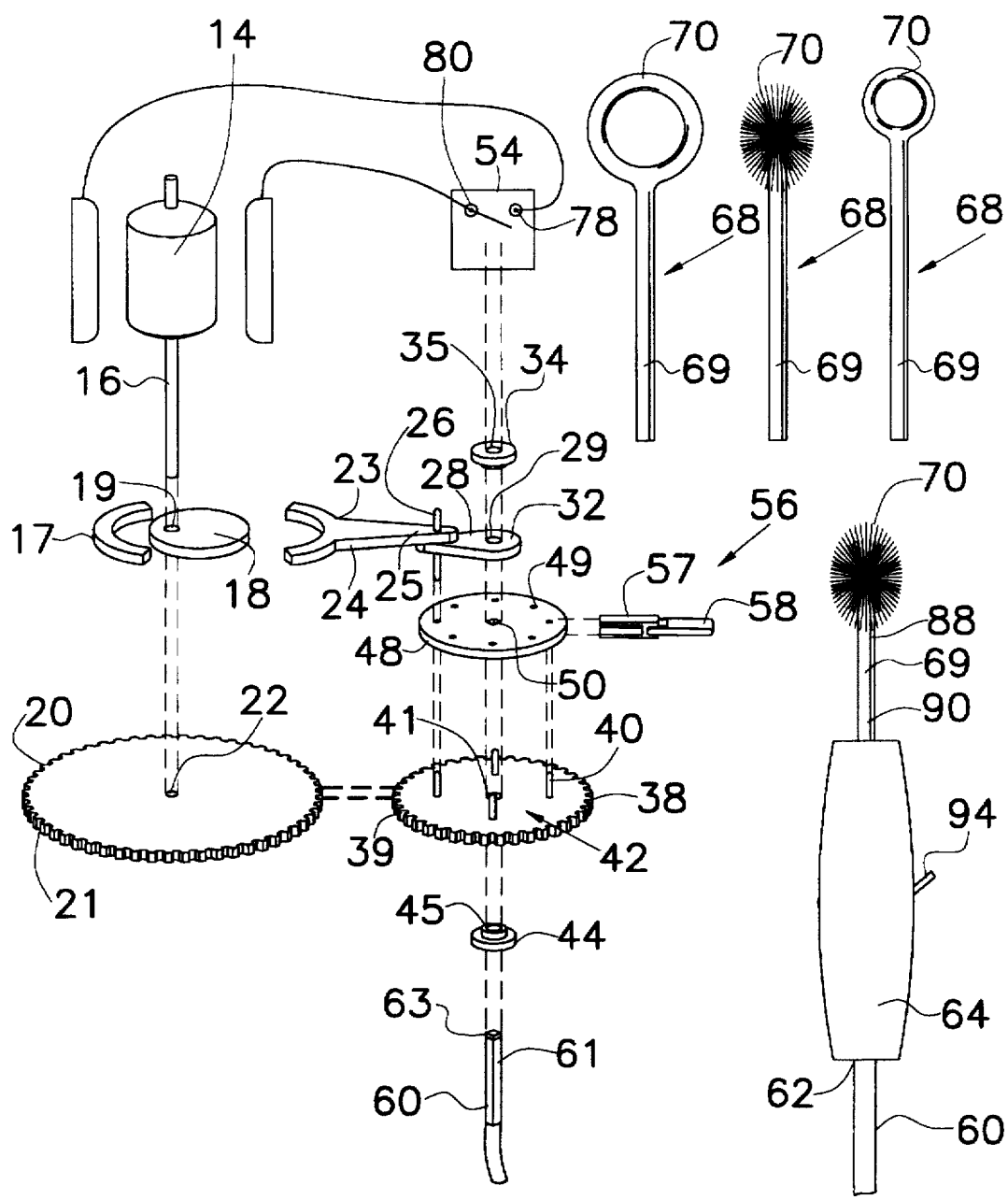
FIG. 3 illustrates an exploded view of the motor of the kitchen appliance of the present invention.

The motor and gear assembly 12 is shown in an exploded view in FIG. 3. The motor 14 defines a shaft 16 to which an eccentric 18 and a drive gear 20 are fixedly secured. Specifically, the eccentric 18 and the drive gear 20 each define openings 19, 22, respectively, which receive the motor shaft 16. In the preferred embodiment, the motor is a 115 volts, 0.8 amp and 1.6 watt shaded pole motor with shaft that has a maximum rotational speed of 1500 rpm.

In the preferred embodiment, the drive gear 20 defines gear teeth 21 around its circumference. The drive gear 20 drives a driven gear 38 which defines gear teeth 39 around its circumference. The teeth 21, 39 of the drive gear 20 and the driven gear 38 are matable. It will be noted that, in an alternate embodiment, the drive gear 20 and the driven gear 38 carry rubber treads for quieter operation. The driven gear 38 defines an opening 41 at its center. In the preferred embodiment, the driven gear 38 rests on a bushing 44 which defines an opening 45 therethrough. The openings 41, 45 of the driven gear 38 and the bushing 44 are aligned. Further, a plurality of equally spaced radial pegs 40 are carried on an upper surface 42 of the gear 38. Preferably, four pegs 40 are carried on the driven gear 38, as shown in FIG. 3.

The eccentric 18 includes a circular strap 17 which works freely around the rim of the eccentric 18. A first end 23 of a rod 24 is secured to the circular strap 17 and extends therefrom. The second end 25 of the rod 24 is pivotally secured to the first end 30 of a cable arm 28. In the preferred embodiment, the rod 24 and the cable arm 28 are pivotally secured to one another via a pin 26 received through an opening 27 defined by the first end 23 of the rod 24 and an opening 31 defined by the first end 30 of the cable arm 28. The second end 32 of the cable arm 28 defines a cable arm opening 29. The cable arm opening 29 is aligned with the driven gear opening 41. In the preferred embodiment, the upper side of the cable arm 28 is supported by a bushing 34 which defines an opening 35 therethrough. The bushing opening 35 and the cable arm opening 29 are aligned.

A cable engagement wheel 48 is positioned between the driven gear 38 and the cable arm 28. The cable engagement wheel 48 defines plurality of equally spaced radial openings 49 through the wheel 48 and a cable engaging opening 50 at its center. The radial openings 49 are configured to be receivable by the pegs 40 of the driven wheel 38. Further, each of the radial openings 49 are configured to be receivable by the end of the pin 26 which secures the rod 24 and cable arm 28 together. The cable engaging opening 50 is aligned with cable arm opening 29 and the driven gear opening 41.

It will be noted that in an alternate embodiment, the motor and gear assembly is rearranged wherein the drive gear is positioned above the eccentric on the motor shaft. Accordingly, the positions of the driven gear and the rod and cable arm assembly are reversed from the positions shown in FIG. 3. The cable engagement wheel is positioned between the cable arm and the driven gear.

Figure 3A:
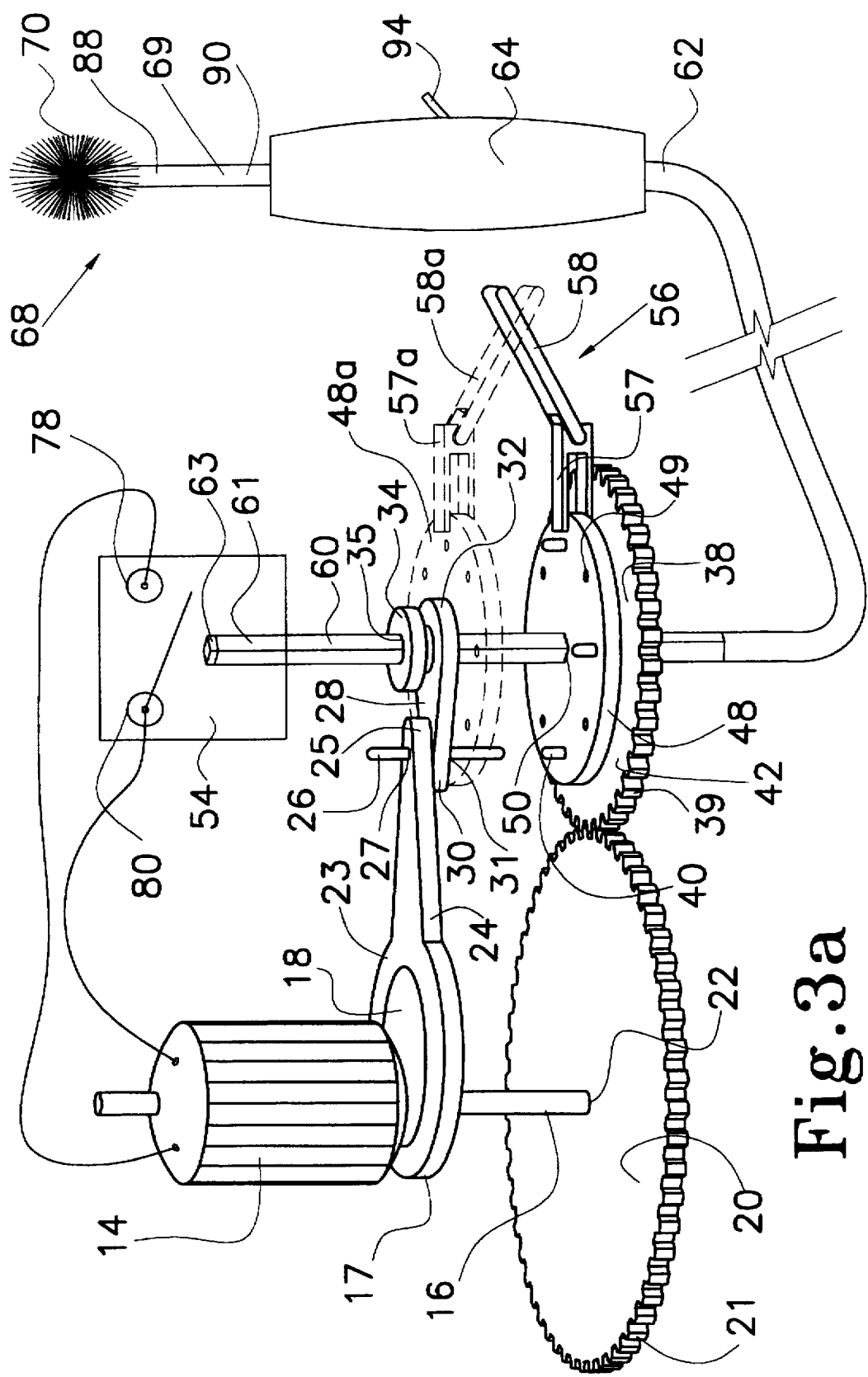
FIG. 3A illustrates the components of FIG. 3 assembled.

The first end 61 of cable 60 is received through the driven gear bushing opening 45, the driven gear opening 41, the cable engaging opening 50, the cable arm opening 29 and the cable arm bushing opening 35 as shown in FIG. 3A. The outer surface of the cable 60, at least at the first end 61, is noncircular and can be axially slotted, square or triangular in configuration, for example. The cable engaging opening 50 of the cable engagement wheel 48 is configured to engage the outer surface of the cable 60 and permits the cable 60 to pass therethrough, but the cable 60 cannot rotate in the cable engaging opening 50. With this configuration, the rotation or oscillation of the cable engagement wheel 48 dictates the rotation or oscillation of the cable 60. The bushings 34, 44, the driven gear 38 and the cable arm 28 are rotatable around the cable 60. In the preferred embodiment, the cable is approximately 2 feet long. Further, in the preferred embodiment, the cable 60 is a speedometer type cable.

As stated previously, the motor and gear assembly 12 is designed to provide two modes of pivoting motion to the cable 60, a rotation mode and an oscillation mode. The mode in which cable pivots is determined by the position of the cable engagement wheel 48. In the oscillation mode, the cable engagement wheel 48 is supported against the cable arm 28. One of the radial openings 49 of the cable engagement wheel 48 receives the pin 26 securing the rod 24 and the cable arm 28 together. In this position, the cable engagement wheel 48 oscillates in a semicircular fashion when the motor and gear assembly 12 is operating. Specifically, the rod 24 moves in a substantially back and forth motion due to the motion imparted to it by the eccentric 18. The back and forth motion is imparted to the end of the cable arm 28 which pivots with respect to the cable 60 thereby causing the end 30 of the cable arm 28 to oscillate in a semicircular fashion. The pin 26, which secures the end 30 of the cable arm 28 to the rod 24, is received by a radial opening 49 of the cable engagement wheel 48 such that the cable engagement wheel 48 also oscillates in a semicircular fashion. Because the cable engaging opening 50 forces the cable 60 to move when the cable engagement wheel 48 moves, the cable 60 oscillates between clockwise and counterclockwise directions.

In the rotation mode, the cable engagement wheel 48 is supported on the driven gear 38. The radial openings 49 of the cable engagement wheel 48 receive each of the pegs 40 defined by the driven gear 38. In this mode, the cable engagement wheel 48 rotates when the motor and gear assembly 12 is operating. Specifically, when the drive gear 20 rotates it drives the driven gear 38. With the cable engagement wheel 48 being supported on the driven gear 38, it also rotates and forces the cable 60 to rotate due to the engagement of the cable 60 in the cable engaging opening 50.

In the preferred embodiment, a cable engagement lever 56 is used to lift or lower the cable engagement wheel 48 to engage the pegs of the driven wheel or the pin of the cable arm and rod. In the preferred embodiment, the lever includes a first end 57 which is pivotally mounted to a second end 58. The first end 57 of the lever 56 is configured to support, as well as permit the rotation of, the cable engagement wheel 48 in either position. Preferably, the first end 57 of the lever 56 is slotted to support both the upper side and lower side of the cable engagement wheel 48. The second end 58 is used to control the raising and lowering of the first end 57 and thus the cable engagement wheel 48. Specifically, when the second end 58 of the lever 56 is lowered, the cable engagement wheel 48 is raised, and when the second end 58 of the lever 56 is raised, the cable engagement wheel 48 is lowered. Preferably, the second end 58 of the lever 56 is inserted through the housing 11 such that control of the lever 56 is permitted at a the housing 11, as shown in FIG. 1.

A motor and gear assembly switch 54 is positioned above the cable arm bushing 34 and aligned with the cable arm opening 29 and cable arm bushing opening, as shown in FIG. 3. The motor and gear assembly switch includes a first 78 and second electrical contact 80. The contacts 78, 80, when forced together, complete a circuit to begin operation of the motor and gear assembly 12. The motor and gear assembly switch 54 is closable via the cable 60 or a manual switch 55. The motor and gear assembly switch 54 is closed by the cable 60 when the first end 61 of the cable 60 is forced upward to drive one electrical contact 78 to touch the other electrical contact 80. In the preferred embodiment, the first end 61 of the cable 60 carries a plastic tip 63.

The manual switch 55 is used to control the motor and gear assembly switch 54 and includes a means for closing the switch 54 without the use of the cable 60. Preferably, the manual switch 55 extends through and is mounted on the housing 11 and includes at least "on", "off" and "manual on" positions. In the "on" position, operation of the motor and gear assembly 12 does not occur until the switch 54 is closed by forcing the first end 61 of the cable 60 up to close the contacts 78, 80. In the "manual on" position, the circuit is closed without the cable 60. The "off" position prevents the operation of the motor and gear assembly 12. In an alternate embodiment, it may be desirable to include another switch for controlling the speed at which the motor and gear assembly causes the cable to oscillate or rotate.

The handle 64 defines a spring and lever assembly 66 which is configured to control the movement of the cable 60 through the handle 64 to activate the switch 54 of the motor and gear assembly 12 and to translate the rotation of the cable 60 to an attachment 68 secured to the first end 84 of the handle 64. The spring and lever assembly 66 is positioned proximate the first end 84 of the handle 64 and defines a connector 92, a lever 94, a stop ring 96 and a spring 98, as shown in FIG. 1. The connector 92 is slidably retained in an opening 100 defined by the handle 64 proximate its first end 84. The second end 62 of the cable 60 extends through the handle 64 via a cylindrical opening 102 defined by the handle 64 and is mounted in the second end 106 of the connector 92. A shoulder 101 is defined between the connector opening 100 and the cylindrical opening 102 and the spring 98 is positioned between the second end 106 of the connector 92 and the shoulder 101, as shown in FIG. 1. The stop ring 96 is carried by the cable 60 proximate the second end 62 thereof. The lever 94 is configured to engage the stop ring 96 to force the cable 60 through the handle 64. Specifically, when the second end 110 of the lever 94 is pressed down the first end 108 pivots downward at pivot point 116 engages the stop ring 96 thereby moving the cable 60. A top view of the first end 108 of the lever 94 is shown in FIG. 4. The first end 108 of the lever 94 defines at least one slot 112 for receiving the cable 60 therethrough. The slot 112 is configured to permit the cable 60 to pass through but does not permit the stop ring 96 to pass though. The spring and lever assembly 66 is configured such that when the lever 94 is pressed down, the cable 60 is forced through the handle 12 thereby forcing the first end 61 of the cable 60 upward through the driven gear bushing opening 45, the driven gear opening 41, the cable engaging opening 50, the cable arm opening 29 and the cable arm bushing opening 34 to close the contacts 78, 80. In the preferred embodiment, the portion of the cable 60 extending between the housing 11 and the handle 64 is sheathed in or coated with plastic.

The first end 104 of the connector 92 defines an opening 67 which is configured to receive an attachment 68 therein. Each attachment 68 defines a shaft 69 which carries a head 70 at its first end 88. Preferably, the second end 90 of the shaft 69 is square or hexagonal in shape. The second end 90 of the attachment 68 is releasably securable in the first end 104 of the connector 92. In the preferred embodiment, a circlip 114 retains the shaft 69 of the attachment 68 in the first end 104 of the connector 92 during operation.

The head 70 of the attachment 68 defines a configuration such that when rotated or oscillated it serves a selected purpose. For example, the head 70 can define a brush which when rotated or oscillated can be used to clean glasses and dishes. Moreover, the head 70 can define a ring such that when rotated, the ring 70 can be used to blend or mix. Each of the attachments in FIG. 3 defines a different head and particularly the attachments include a variety of brushes for washing and/or polishing and a plurality of rings for blending or mixing. It will be noted the configuration of the head 70 of each attachment 68 is not limited to those depicted in FIG. 3.

The operation of the kitchen appliance 10 is as follows. An attachment 68 is secured within the connector in the end of the handle 64. The oscillation or a rotation mode is selected by manipulating the end of the lever 56 which extends from the housing 11. The manual switch 55 is turned to the "on" position or the "manual on" position depending upon how the user desires to power the appliance 10. Specifically, if the "on" position is chosen, the motor and gear assembly 12 begins to operate when the lever 94 on the handle 64 is pressed down thereby forcing the cable 60 upward through the housing 11 to close the motor and gear assembly switch 54. When the lever is released, the cable 60 moves downward, due to the biasing action of the spring 98, releasing the switch 54 and the motor and gear assembly 12 ceases to operate. Another means for starting the motor and gear assembly 12 is to press the attachment 68 against a surface such that the connector 92 moves into the handle 64 forcing the cable 60 to close the switch 54 of the motor and gear assembly 12. The spring 98 biases the connector 92 in a position such that the first end 61 of the cable 60 is not in contact with the switch 54. With the spring 98 biasing the connector 92, the motor and gear assembly 12 ceases to operate when the attachment 68 is no longer pressed against a surface. When the manual switch 55 is in the "manual on" position, the motor and gear assembly 12 operates and the lever does not need to be pressed.

When the attachment 68 is rotating or oscillating it can be used for its intended purpose. To change the attachment 68, the motor and gear assembly 12 should not be operating. Moreover, to change from the oscillation to the rotation mode or vice versa the motor and gear assembly 12 should not be operating.

Although the handle of the appliance can be held during use, it may be desirable to operate the appliance in a hands free manner. One method of using the appliance in a hands free manner is to utilize a wire frame which is configured to be supportable on the rim of a bowl and further, is configured to support the handle in the bowl, as shown in FIG. 5. Specifically, the wire frame defines an opening dimensioned to securely receive the handle.

It will be noted that the second end 62 of the cable 60 and the handle 64 are remote from the electrical source and the first end 61 of the cable 60 is insulated via the plastic tip. The cable does not deliver electricity. With this configuration the handle 64 and the attachment 68 can be used in or by running water without the risk of electric shock or electrocution.

From the foregoing description, it will be recognized by those skilled in the art that a kitchen appliance with a flexible drive offering advantages over the prior art has been provided. Specifically, the kitchen appliance provides a motor and gear assembly for driving an attachment wherein the motor and gear assembly is remote from the attachment. Further, the kitchen appliance includes a means for oscillating and rotating the attachment.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention,

I claim:

1. A kitchen appliance with a flexible drive comprising:
   a flexible cable defining a first end, a second end and a longitudinal axis, said second end being received by a first end of a handle, a second end of said handle for receiving a shaft of an attachment, said shaft being securable to said second end of said flexible cable; and a motor and gear assembly for receiving said first end of said flexible cable and for pivoting said flexible cable with respect to said longitudinal axis thereby pivoting said attachment, said motor and gear assembly includes a motor and gear assembly switch which when closed completes a circuit for activating said motor and gear assembly, said motor and gear assembly switch being remote from said handle.

2. The kitchen appliance of claim 1 wherein said motor and gear assembly is configured to provide an oscillating mode and a rotating mode, said oscillating mode and said rotation mode being selectable in an alternative manner.

3. The kitchen appliance of claim 1 wherein said motor and gear assembly includes a motor defining a motor shaft to which an eccentric and a drive gear are fixedly secured, said eccentric including a circular strap which works freely around said eccentric, said drive gear defining drive gear teeth around a circumference of said drive gear, a driven gear defining driven gear teeth around a circumference thereof, said driven gear teeth being matable with said drive gear teeth such that said drive gear drives said driven gear when said motor shaft rotates, said driven gear defining an opening in the center thereof for receiving said first end of said flexible cable therethrough, said driven gear being pivotable around said flexible cable, said driven gear carrying a plurality of equally spaced radial pegs, a rod defining a first end and a second end, said first end secured to a portion of said circular strap and extending therefrom, said second end defining an opening therethrough, a cable arm defining a first end with an opening therethrough and a second end with an opening therethrough, said first end of said cable arm and said second end of said rod being pivotally secured to one another via a pin inserted through the first end opening of the cable arm and the second end opening of the rod, said opening through said second end of said cable arm for receiving said first end of said flexible cable therethrough, said cable arm pivoting around said flexible cable, a cable engagement wheel defining a plurality of equally spaced radial openings and a cable engaging opening, said cable engagement wheel being positioned between said driven gear and said cable arm, said plurality of radial openings being dimensioned and spaced to be receivable by said plurality of pegs of said driven gear, said radial openings being dimensioned to be receivable by said pin, said cable engaging opening receiving said first end of said cable and permitting said cable to pass therethrough, said cable engaging opening being configured to engage said outer surface of said cable such that as said cable engagement wheel pivots said cable pivots, and a lever for lifting and lowering said cable engagement wheel to permit the alternative engagement of said plurality of said radial openings of said cable engagement wheel with said plurality of pegs of said driven gear and one of said plurality of radial openings with said pin.

4. The kitchen appliance of claim 3 wherein said first end of said flexible cable defines a noncircular outer surface, said cable engaging opening being configured to engage said noncircular outer surface to prevent radial rotation of said flexible cable in said cable engaging opening, said flexible cable being movable in an axial direction through said cable engaging opening.

5. The kitchen appliance of claim 3 wherein said motor and gear assembly switch when closed completes a circuit for starting said motor, said motor and gear assembly switch being aligned with said first end of said flexible cable, said first end of said flexible cable being movable to engage and close said motor and gear assembly switch.

6. The kitchen appliance of claim 5 wherein a lever assembly is secured to said second end of said flexible cable within said handle, said lever assembly being configured to force a portion of said flexible cable proximate said second end through said first end of said handle.

7. The kitchen appliance of claim 1 wherein said motor and gear assembly switch is aligned with said first end of said flexible cable, a spring and lever assembly being secured to said second end of said flexible cable within said handle, said spring and lever assembly being configured to force a portion of said flexible cable proximate said second end through said first end of said handle when said spring and lever assembly is activated thereby moving said first end of said flexible cable such that it engages and closes said motor and gear assembly switch.

8. A kitchen appliance with a flexible drive comprising:

a flexible cable defining a first end, a second end and a longitudinal axis, said second end being received by a first end of a handle, a second end of said handle for receiving a shaft of an attachment, said shaft being securable to said second end of said flexible cable; and a motor and gear assembly for receiving said first end of said flexible cable and for pivoting said flexible cable with respect to said longitudinal axis thereby pivoting said attachment, said motor and gear assembly being configured to provide an oscillating mode and a rotating mode, said oscillating mode and said rotation mode being selectable in an alternative manner; and a motor and gear assembly switch which when closed completes a circuit thereby starting said motor, said motor and gear assembly switch being aligned with said first end of said flexible cable, a spring and lever assembly being secured to said second end of said flexible cable within said handle, said spring and lever assembly being configured to force a portion of said flexible cable proximate said second end through said first end of said handle when said spring and lever assembly is activated thereby moving said first end of said flexible cable such that it engages and closes said motor and gear assembly switch.

9. The kitchen appliance of claim 8 wherein said motor and gear assembly includes a motor defining a motor shaft to which an eccentric and a drive gear are fixedly secured, said eccentric including a circular strap which works freely around said eccentric, said drive gear defining drive gear teeth around a circumference of said drive gear, a driven gear defining driven gear teeth around a circumference thereof, said driven gear teeth being matable with said drive gear teeth such that said drive gear drives said driven gear when said motor shaft rotates, said driven gear defining an opening in the center thereof for receiving said first end of said flexible cable therethrough, said driven gear being pivotable around said flexible cable, said driven gear carrying a plurality of equally spaced radial pegs, a rod defining a first end and a second end, said first end secured to a portion of said circular strap and extending therefrom, said second end defining an opening therethrough, a cable arm defining a first end with an opening therethrough and a second end with an opening therethrough, said first end of said cable arm and said second end of said rod being pivotally secured to one another via a pin inserted through the first end opening of the cable arm and the second end opening of the rod, said opening through said second end of said cable arm for receiving said first end of said flexible cable therethrough, said cable arm pivoting around said flexible cable, a cable engagement wheel defining a plurality of equally spaced radial openings and a cable engaging opening, said cable engagement wheel being positioned between said driven gear and said cable arm, said plurality of radial openings being dimensioned and spaced to be receivable by said plurality of pegs of said driven gear, said radial openings being dimensioned to be receivable by said pin, said cable engaging opening receiving said first end of said cable and permitting said cable to pass therethrough, said cable engaging opening being configured to engage said outer surface of said cable such that as said cable engagement wheel pivots said cable pivots, and a lever for lifting and lowering said cable engagement wheel to permit the alternative engagement of said plurality of said radial openings of said cable engagement wheel with said plurality of pegs of said driven gear and one of said plurality of radial openings with said pin.

10. The kitchen appliance of claim 9 wherein said first end of said flexible cable defines a noncircular outer surface, said cable engaging opening being configured to engage said noncircular outer surface to prevent radial rotation of said flexible cable in said cable engaging opening, said flexible cable being movable in an axial direction through said cable engaging opening.

11. A kitchen appliance with a flexible drive comprising:

a flexible cable defining a first end, a second end and a longitudinal axis, said second end being received by a first end of a handle, a second end of said handle for receiving a shaft of an attachment, said shaft being securable to said second end of said flexible cable; and a motor and gear assembly for receiving said first end of said flexible cable and for pivoting said flexible cable with respect to said longitudinal axis thereby pivoting said attachment, said motor and gear assembly being configured to provide an oscillating mode and a rotating mode, said oscillating mode and said rotation mode being selectable in an alternative manner.

* * * * *